(12) United States Patent
Nunokawa et al.

(10) Patent No.: US 9,135,933 B2
(45) Date of Patent: Sep. 15, 2015

(54) TAPERED WRITE HEAD FOR MAMR

(71) Applicant: HGST Netherlands B.V., Amsterdam (NL)

(72) Inventors: Isao Nunokawa, Odawara (JP); Mikito Sugiyama, Odawara (JP); Yuta Udo, Odawara (JP)

(73) Assignee: HGST NETHERLANDS B.V., Amsterdam (NL)

( * ) Notice: Subject to any disclaimer, the term of this patent is extended or adjusted under 35 U.S.C. 154(b) by 8 days.

(21) Appl. No.: 14/075,710

(22) Filed: Nov. 8, 2013

(65) Prior Publication Data
US 2015/0131184 A1   May 14, 2015

(51) Int. Cl.
| | |
|---|---|
| G11B 5/17 | (2006.01) |
| G11B 5/00 | (2006.01) |
| G11B 5/35 | (2006.01) |
| G11B 5/33 | (2006.01) |
| G11B 5/127 | (2006.01) |
| G11B 5/31 | (2006.01) |

(52) U.S. Cl.
CPC ............ *G11B 5/35* (2013.01); *G11B 5/1278* (2013.01); *G11B 5/3116* (2013.01); *G11B 5/332* (2013.01); *G11B 2005/0024* (2013.01)

(58) Field of Classification Search
CPC ...... G11B 5/1278; G11B 5/3116; G11B 5/35; G11B 5/332; G11B 2005/0024
USPC ................. 360/125.3, 125.31, 125.71, 128
See application file for complete search history.

(56) References Cited

U.S. PATENT DOCUMENTS

| | | | |
|---|---|---|---|
| 7,532,433 B2 | 5/2009 | Kawato et al. | |
| 8,081,397 B2 | 12/2011 | Funayama et al. | |
| 8,233,233 B1 * | 7/2012 | Shen et al. | 360/125.03 |
| 8,264,799 B2 | 9/2012 | Akiyama et al. | |
| 8,264,916 B1 | 9/2012 | Aoyama et al. | |
| 8,305,711 B2 | 11/2012 | Li et al. | |
| 8,320,079 B2 | 11/2012 | Iwasaki et al. | |
| 8,347,489 B2 | 1/2013 | Hong et al. | |
| 8,373,940 B2 | 2/2013 | Maruyama et al. | |
| 8,456,967 B1 * | 6/2013 | Mallary | 369/13.33 |
| 2011/0273800 A1 | 11/2011 | Takano et al. | |
| 2012/0033534 A1 | 2/2012 | Yamanaka et al. | |
| 2012/0314326 A1 | 12/2012 | Takeo et al. | |

OTHER PUBLICATIONS

Guan et al.;"A Trailing Shield Perpendicular Writer Design With Tapered Write Gap for High Density Recording"; IEEE Transactions on Magnetics, vol. 44, No. 11, Nov. 2008; 4 pages.

* cited by examiner

*Primary Examiner* — Gustavo Polo
(74) *Attorney, Agent, or Firm* — Patterson & Sheridan, LLP (57) ABSTRACT

Embodiments described herein provide an MAMR head structure which provides a magnetic recording device equipped with a high density recording magnetic head. Characteristic variations caused by misalignment of a main pole and a STO may be reduced because the STO may be aligned with a position on the main pole where the field intensity is enhanced. The enhanced field intensity may be provided by an angle of inclination θ1 of an inclined surface on which the STO may be formed when compared to an angle of inclination θ2 around the main pole in the region of the ABS. Further embodiments provide a method for producing an MAMR head in which an exposed surface of the main pole has an angle of inclination θ2 which is less than the angle of inclination θ1 for the inclined surface of the main pole where the STO is mounted.

10 Claims, 7 Drawing Sheets

TAPERED WRITE HEAD FOR MAMR

BACKGROUND OF THE INVENTION

1. Field of the Invention

Embodiments described herein generally relate to a magnetic recording device for recording/reproducing data using the magnetization state of a recording medium. More specifically, embodiments described herein relate to a tapered write head for microwave assisted magnetic recording (MAMR).

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

In recent years, the data recording density of magnetic recording devices has continued to increase and the size of 1 bit of a magnetic recording mark for recording to a magnetic medium continues to become smaller. When the magnetic recording density exceeds about 1 Tera bit per square inch (Tbpsi), there is a risk of data recorded to a magnetic recording medium being erased at room temperature due to the effects of heat fluctuation. In order to prevent data from being erased by the effect of heat fluctuation, it is generally necessary to raise the coercive force of the magnetic recording medium. However, there is a limit to the amount of magnetic flux released by a magnetic recording head from recording data by magnetization reversal of a magnetic recording medium.

Measures for solving the above referenced problem have recently focused on assisted recording systems for recording data in conjunction with other technology. One such measure that has been proposed to achieve a high recording density is a method in which a MAMR head is utilized. A high frequency magnetic field is applied to recording bits in a magnetic recording medium in order to weaken the coercive force of the recording bits. In this method, data may be recorded using a conventional magnetic recording head. A MAMR enabled magnetic recording head utilizes a spin torque oscillator (STO) for generating a microwave (high frequency AC magnetic field). Typically the STO may include a field generation layer (FGL) for generating an AC magnetic field, a spacer layer, and a spin polarization layer (SPL) for transmitting spin polarized torque. When the magnetic field from the write head is applied and current is conducted to the STO, the STO oscillates and may provide an AC magnetic field to the medium. The AC magnetic field may reduce the coercive force of the recording medium, thus high quality recording by MAMR may be achieved.

A MAMR head provides an effective assistance effect that enables a high recording density by virtue of the fact that an oscillator for generating a high frequency magnetic field is provided at a position of a main pole where the field intensity and magnetic field gradient are highest in the region of the ABS. In order to write data to the magnetic recording medium, in conjunction with the main pole of the magnetic head, the magnetic field may be concentrated on the magnetic recording medium. However, the main pole and the oscillator which are formed in different production processes are likely to have characteristic variations due to misalignment. The misalignment may reduce reliability of the MAMR head.

Therefore, there is a need in the art for an apparatus having a properly aligned main pole and oscillator in an MAMR head. Further, there is a need in the art for methods of forming an aligned main pole and oscillator in an MAMR head.

SUMMARY OF THE INVENTION

Embodiments described herein provide an MAMR head structure which provides a magnetic recording device equipped with a high density recording magnetic head. Characteristic variations caused by misalignment of a main pole and a STO may be reduced because the STO may be aligned with a position on the main pole where the field intensity is enhanced. The enhanced field intensity may be provided by an angle of inclination $\theta1$ of an inclined surface on which the STO may be formed when compared to an angle of inclination $\theta2$ around the main pole in the region of the ABS. Further embodiments provide a method for producing an MAMR head in which an exposed surface of the main pole has an angle of inclination $\theta2$ which is less than the angle of inclination $\theta1$ for the inclined surface of the main pole where the STO is mounted.

In one embodiment, an MAMR head is provided. The MAMR head may comprise a main pole, a trailing shield formed on a trailing side of the main pole, and an STO formed on the main pole adjacent an ABS. A first region of the main pole may have an angle of inclination $\theta1$ and a second region of the main pole may have an angle of inclination $\theta2$ which is different from the angle of inclination $\theta1$.

In another embodiment, an MAMR head is provided. The MAMR head may comprise a main pole, a trailing shield formed on a trailing side of the main pole, and an STO formed on the main pole adjacent an ABS. A first region of the main pole may have an angle of inclination $\theta1$ and a second region of the main pole may have an angle of inclination $\theta2$. The angle of inclination $\theta1$ and the angle of inclination $\theta2$ may satisfy the relationship $\theta1>\theta2$.

In yet another embodiment, a method of forming an MAMR head is provided. The method may comprise providing an MAMR substrate comprising a main pole and a trailing shield. A layered film may be formed over the MAMR substrate. The layered film may be masked with a processing mask. The layered film may be etched to expose a first region of the main pole and the main pole may be further etched to expose a second region of the main pole.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The MAMR head structure, according to various embodiments described herein, provides a magnetic recording device equipped with a high density recording magnetic head in which characteristic variations caused by misalignment of the main pole and STO are restricted because the STO is aligned with a position on the main pole where the field intensity is enhanced. The positioning of the STO may result from increasing the angle of inclination of the surface on which the STO is provided as compared to the angle of inclination around the main pole in the region of the ABS. Data may be prevented from being erased do to the effect of heat fluctuation as a result of the high frequency magnetic field of the STO and the magnetic flux of the main pole being concentrated and irradiated onto the magnetic recording medium. Thus, data may be recorded to the magnetic recording medium which exhibits an increased coercive force.

A method for producing an MAMR head, according to various embodiments described herein, provides a head in which the inclined surface on the trailing side of the main has an angle of inclination which is lower than the angle of inclination where the STO is provided.

Figure 1:
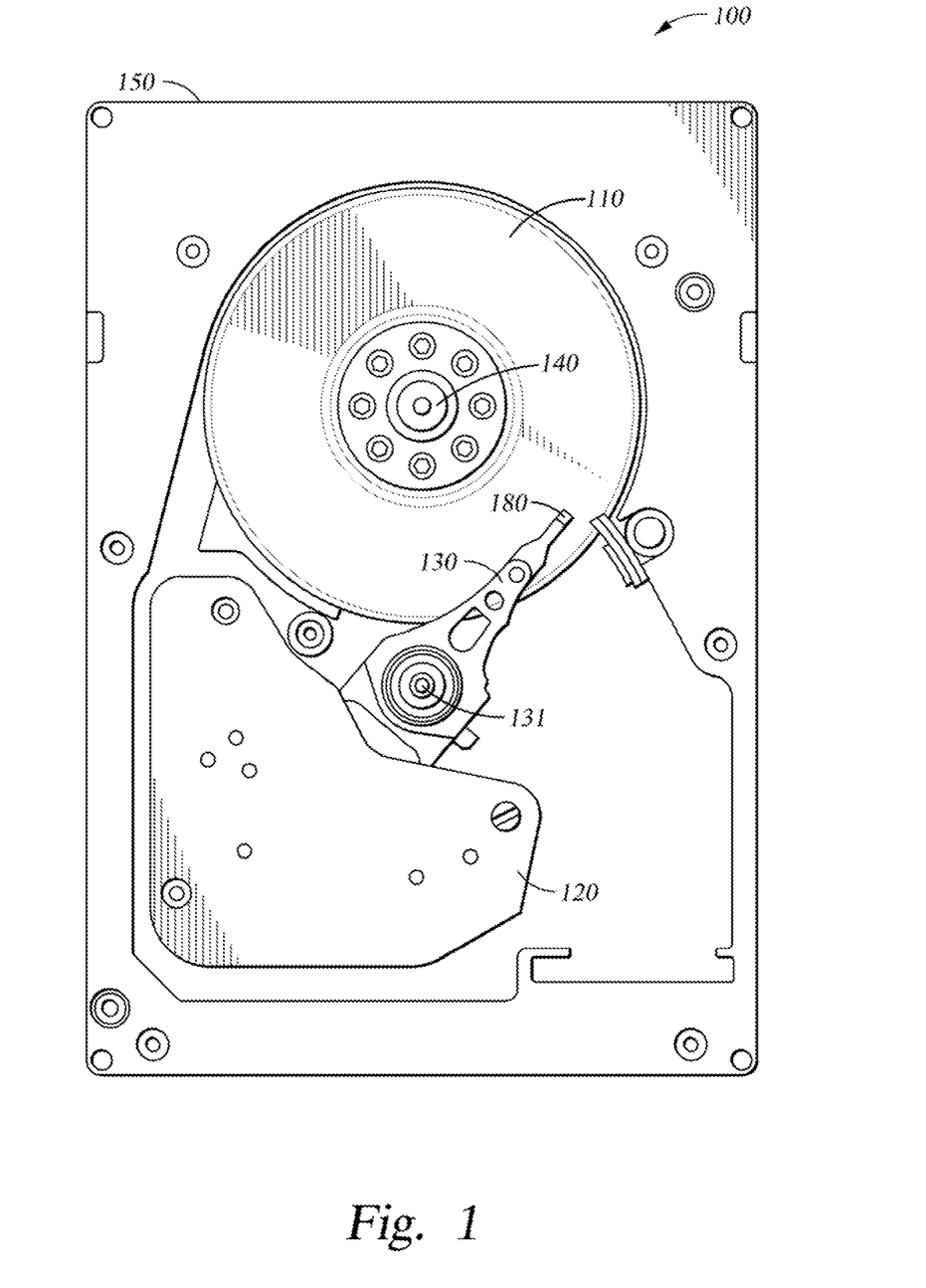
FIG. 1 illustrates an exemplary magnetic disk drive, according to certain embodiments.

FIG. 1 illustrates a top view of an exemplary hard disk drive (HDD) 100. The HDD 100 may include one or more magnetic disks 110, an actuator 120, actuator arms 130 associated with each of the magnetic disks 110, and a spindle motor 140 affixed in a chassis 150. The one or more magnetic disks 110 may be arranged vertically as illustrated in FIG. 1. Moreover, the one or more magnetic disks may be coupled with the spindle motor 140.

The magnetic disks 110 may include circular tracks of data on both the top and bottom surfaces of the disk. A magnetic head 180 mounted on a slider may be positioned adjacent a track. As each disk spins, data may be written on and/or read from the data track. The magnetic head 180 may be coupled to the actuator arm 130. The actuator arm 130 may be configured to swivel around an actuator axis 131 to place the magnetic head 180 adjacent a particular data track.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
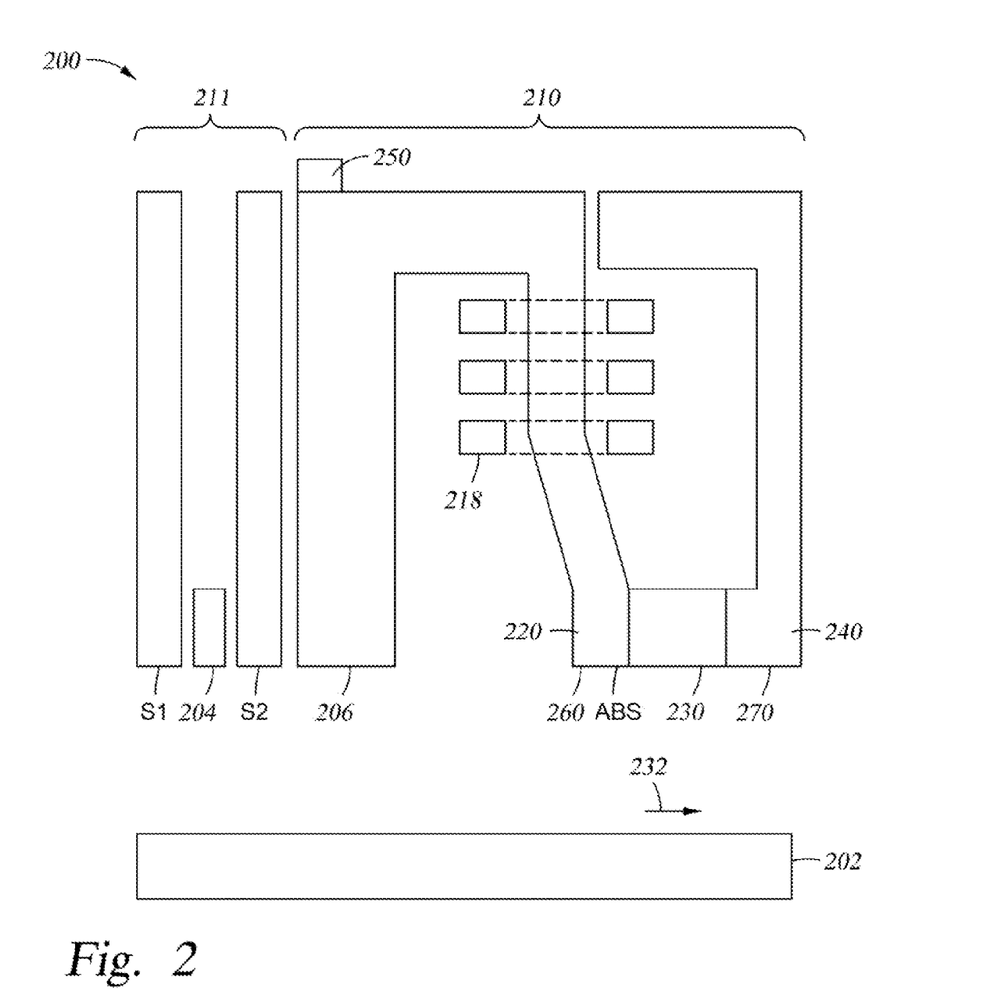
FIG. 2 is a cross-sectional side view of a read/write head and magnetic disk of the disk drive of FIG. 1, according to certain embodiments.

FIG. 2 is a fragmented, cross sectional side view through the center of a MAMR read/write head 200 facing a magnetic disk 202. The read/write head 200 and the magnetic disk 202 may correspond to the magnetic head assembly 180 and the magnetic disk 110, respectively in FIG. 1. The read/write head 200 may include an ABS, a magnetic write head 210 and a magnetic read head 211, and may be mounted such that the ABS faces the magnetic disk 202. In FIG. 2, the disk 202 moves past the write head 210 in the direction indicated by the arrow 232.

The magnetic read head 211 may be a magnetoresistive (MR) read head that includes an MR sensing element 204 located between MR shields S1 and S2. In other embodiments, the magnetic read head 211 may be a magnetic tunnel junction (MTJ) read head that includes an MTJ sensing device 204 located between MR shields S1 and S2. The magnetic fields of the adjacent magnetized regions in the magnetic disk 202 are detectable by the MR (or MTJ) sensing element 204 as the recorded bits.

The write head 210 may include a return pole 206, a spin torque oscillator (STO) 230 disposed between a main pole 220 and a trailing shield 240, and a coil 218 that excites the main pole 220. A recording magnetic field generated from the main pole 220 and the trailing shield 240 helps making the magnetic field gradient of the main pole 220 steep. The main pole 220 may be a magnetic material such as a CoFe alloy. In one embodiment, the main pole 220 may have a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T.

The main pole 220 and the trailing shield 240 have ends 260, 270 defining part of the ABS, and the STO 230 may be disposed between the main pole 220 and the trailing shield 240. The STO 230 may be surrounded by an insulating material in a cross-track direction (into and out of the paper). During operation, the STO 230 generates an AC magnetic field that travels to the magnetic disk 202 to lower the coercivity of the region of the magnetic disk 202 adjacent the STO 230. The STO 230 will be discussed in detail below. The write head 210 may also include a heater 250 for adjusting the distance between the read/write head 200 and the magnetic disk 202. The location of the heater 250 is not limited to above the return pole 206, as shown in FIG. 2. The heater 250 may be disposed at any suitable location.

Figure 3:
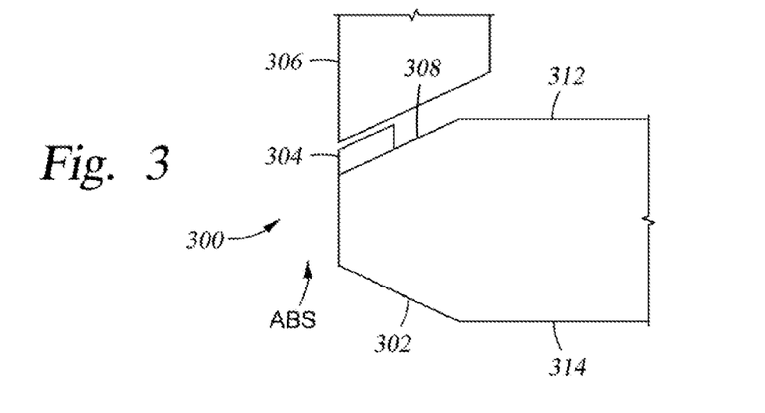
FIG. 3 is a schematic, cross-sectional view of a portion of an MAMR head according to one embodiment.

FIG. 3 is a schematic, cross-sectional view of a portion of an MAMR head 300. The MAMR head 300 may comprise a main pole 302, an STO 304 for generating a high frequency magnetic field, and a trailing shield 306. The STO 304 may be disposed on an inclined surface 308 on a trailing side 312 of the main pole 302 between the main pole 302 and the trailing shield 306. A bias current for exciting a high frequency magnetic field may flow by way of the main pole 302 and the trailing shield 306.

The STO 304 may have a layered structure comprising a perpendicular magnetic anisotropic body, a magnetization high speed rotating body, a nonmagnetic metal spin conduction layer, and a spin injection layer. The perpendicular magnetic anisotropic body may comprise materials such as hexagonal-crystal CoCrPt, NiCo, or the like. The magnetization high speed rotating body may comprise a material such as a CoFe allow or the like and may have a thickness having a high level of saturation magnetization and substantially no crystal magnetic anisotropy. The thickness of the magnetization high speed rotating body may be between about 0.010 μm and about 0.020 μm. The nonmagnetic metal spin conduction layer may comprise a material such a Ru or Cu, which exhibit high spin conductivity and the spin injection layer may comprise a material such as CoPt or the like.

In operation, when the STO 304 applies a bias current for exciting a high frequency magnetic field between the main pole 302 and the trailing shield 306, the magnetization rotates at a high speed within a plane along the layer of the magnetization high speed rotating body. A leakage magnetic field from an ABS may be locally irradiated onto a magnetic recording medium as a high frequency magnetic field.

The main pole 302 may have an inverse trapezoidal shape which may be provided with a bevel for preventing erasure of adjacent track data when the MAMR head 300 moved over the magnetic recording medium. The STO 304 may be disposed in a region of a track center of the main pole 302 in order to locally concentrate the magnetic flux emitted by the main pole 302 and the high frequency magnetic field emitted by the STO 304. As previously discussed, the main pole may have an inclined surface 308 which may increase in thickness in the element height direction on the trailing side 312 and leading side 314. When the inclined surface 308 is provided, the magnetic flux of the induction field excited by a coil is inducted in a concentrated manner to the ABS. Thus, the intensity of the magnetic field emitted onto the magnetic recording medium may be enhanced.

It is believed that the amount of magnetic flux emitted by the main pole 302 and the magnetic field distribution in the track direction fluctuates because of the angle of inclination of the inclined surface 308. Thus, the STO 304 may be provided on the trailing side 312 of the main pole 302 where the field intensity distribution is stable to produce stable oscillation characteristics.

Figure 4A:
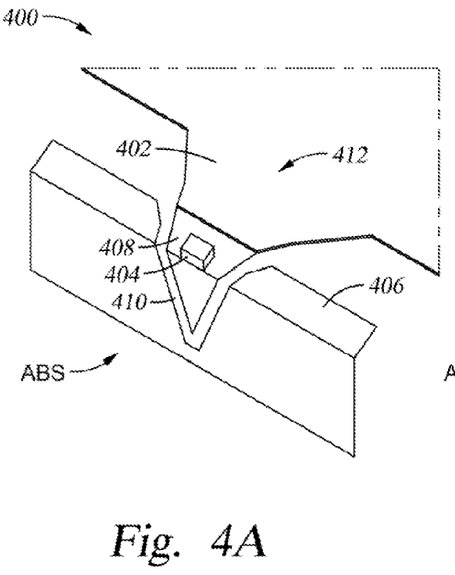
FIG. 4A is a schematic, perspective view of a conventional MAMR head.

FIG. 4A is a schematic, perspective view of a conventional MAMR head 400. The MAMR head 400 may comprise a main pole 402, a trailing shield 406, and a side gap 410 disposed between the main pole 402 and the trailing shield 406. An STO 404 may be mounted on a trailing side 412 of the main pole 402 near the ABS. In this example, a width of the main pole 402 may be reduced such that the width narrows from the element height direction toward the ABS. The angle at which the main pole 402 narrows may be about 45°.

Figure 4B:
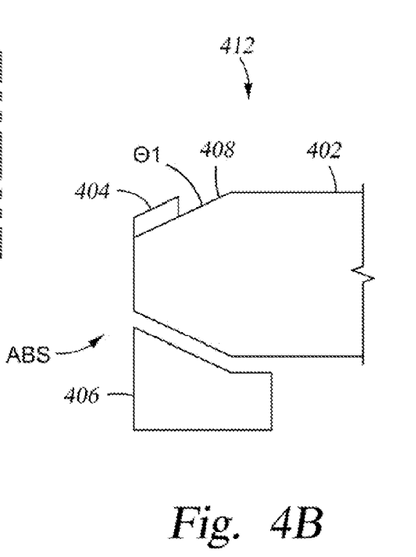
FIG. 4B is a schematic, cross-sectional side view of the MAMR head of FIG. 4A.

FIG. 4B is a schematic, cross-sectional side view of the MAMR head 400 of FIG. 4A. An inclined surface 408 may be formed on the main pole 402 having an angle of inclination θ1 on the trailing side 412 of the main pole 402 to intensify the magnetic field. A thickness of the main pole 402 may define the shape of the main pole 402 at the ABS. The STO 404 may be mounted on the inclined surface 408 of the trailing side 412 of the main pole 402.

In general, several thousand to tens of thousands of elements are produced in a single substrate when the STO 404 is mounted on the main pole 402. Thus, the STO 404 may be misaligned on the main pole 402 due to variations within the plane of the substrate. As a result of misalignment, the mounting position of the STO 404 may be offset from a position on the main pole 402 facing the magnetic recording medium where there is an intense magnetic field from the magnetic flux emission surface and stable field distribution. If a stable assistance effect cannot adequately be provided, there may be characteristic variations in the MAMR head 400 and the recording characteristics may be affected.

Figure 5A:
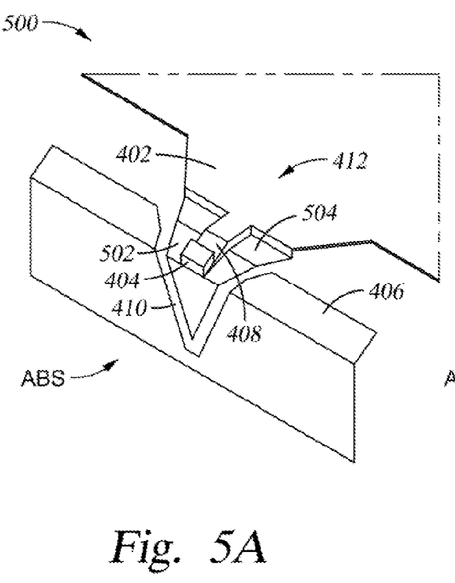
FIG. 5A is a schematic, perspective view of an MAMR head according to one embodiment.
Figure 5B:
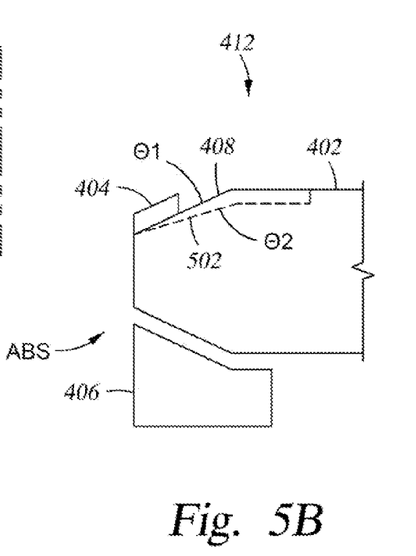
FIG. 5B is a schematic, cross-sectional side view of the MAMR head of FIG. 5A.

FIG. 5A is a schematic, perspective view of an MAMR head 500 according to one embodiment. FIG. 5B is a schematic, cross-sectional side view of the MAMR head of FIG. 5A. Elements of the MAMR head 500 which are the same as the elements of MAMR head 400 of FIGS. 4A-4B will not be discussed for the sake of brevity. The STO 404 and main pole 402 may comprise a layered film and may be formed using a processing pattern in which a width of the STO 404 is processed on an inclined surface 408 having an angle of inclination θ1 which is provided on the trailing side 412 of the main pole 402. The angle of inclination θ1 may be determined from a datum plane reference which is shown as a horizontal dotted line in FIG. 5B. The inclined surface 408 may maintain substantially the same width as the STO 404 about 150 nm or less from the ABS extending to the trailing side 412.

A second inclined surface 502 having an angle of inclination θ2, depicted by the dotted line in FIG. 5B, may be formed on the exposed surface 504 of the main pole 402. The second inclined surface may be recessed from the first inclined surface by a distance of between about 10 nm and about 15 nm, for example, when the angle of inclination θ1 is between about 24° and about 26° and the angle of inclination θ2 is between about 20° and about 22°. Similar to the angle of inclination θ1, the angle of inclination θ2 may be determined from the datum plane reference. The exposed surface 504 may be formed on either side of the STO 404 on the main pole 402. The exposed surface 504 may expand laterally outward to increase a width of the exposed surface 504 from the ABS toward the trailing side 412 over a certain length. For example, a width of the exposed surface 504 at its largest may be slightly greater than a distance formed by the masked portion of the STO 504 extending from a termination edge of the ABS into the main pole 402. A portion of the main pole 402 having a width similar to the width of the STO 404 at the ABS may not be exposed. The STO 404 may be mounted on the main pole 402 which may be processed to the height of the STO 404 from the ABS. The trailing side 412 inclined surface of the main pole 402 may comprise the first inclined surface 408 having an angle in inclination θ1 and the second inclined surface having an angle of inclination θ2. A relationship between the angles of inclination may be θ1>θ2.

If θ1=θ2, misalignment (described with regard to FIGS. 4A-4B) may be problem. Further, if θ1=θ2 and the ABS of the main pole 402 is processed to a convex state in order to produce the same effect as when θ1>θ2, the ABS surface area of the main pole 402 is reduced. The amount of magnetic flux is limited in accordance with the ABS surface area and reducing the ABS surface are of the main pole 402 in order to vary the field distribution of the inclined surface 408 of the main pole 402 where the STO 404 is provided reduces the write field intensity emitted by the main pole 402. The reduction in intensity causes magnetization reversal of the magnetic recording medium.

When θ1>θ2, a magnetic body on the trailing side 412 of the main pole 402 in the height direction of the STO 404 from the ABS may be processed to reduce the angle of inclination. The second inclined surface having an angle of inclination θ2 may restrict the amount of magnetic flux supplied on either side of the STO 404. In this example, the main pole 404 ABS surface area is not reduced and it is possible to obtain a high field intensity and a stable field distribution. Even if the main pole 402 and the STO 404 are misaligned, a high field intensity may be realized where the STO 404 is mounted.

Figure 6A:
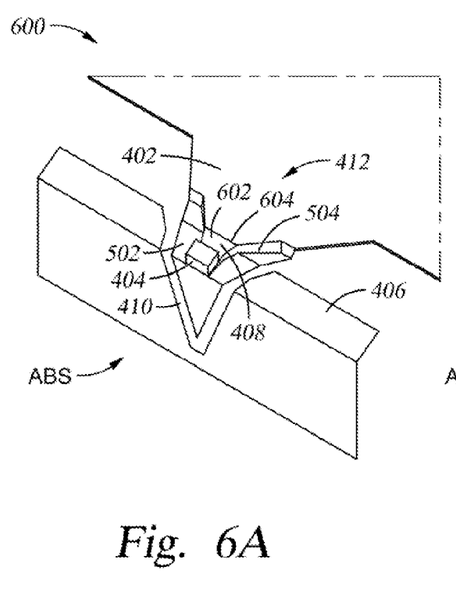
FIGS. 6A and 6C are schematic, perspective views of an MAMR head according to various embodiments.
Figure 6B:
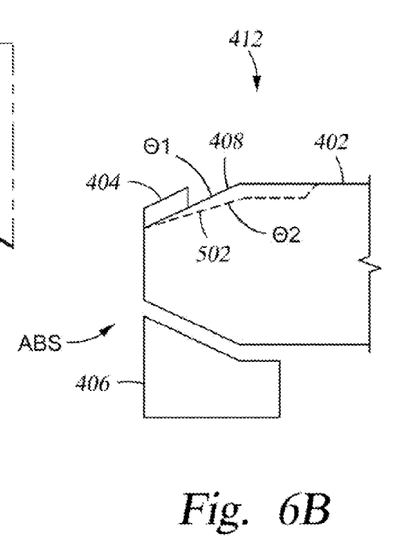
FIGS. 6B and 6D are schematic, cross-sectional side views of the MAMR heads of FIGS. 6A and 6C, respectively.

FIG. 6A is a schematic, perspective view of an MAMR head 600 according to certain embodiments. FIG. 6B is a schematic, cross-sectional side view of the MAMR head 600 of FIG. 6A. The MAMR head 600 of FIGS. 6A-6B may be similar to the MAMR head 500 of FIGS. 5A-5B. However, an expanded portion 602 of the main pole 402 may be defined by the width of the STO 404 at the ABS and may expand in the shape of a trapezium to form an upper edge 604. The upper edge 604 may be substantially the same height as a height of the STO 404. The expanded portion 602 may reduce the exposed surface 502 of the main pole 402. In one example, the expanded portion 602 may expand at an angle of about 45° from a centerline extending from the ABS through the STO 404 to the main pole 402. An amount of the exposed surface 502 in FIG. 6A when compared to the exposed surface 502 in FIG. 5A may be about 25% less due to the expanded portion 602. If the angle of inclination θ1 of the inclined surface 408 of the main pole 402 upon which the STO 404 is mounted is such that θ1>θ2, the MAMR head 600 may produce a high field intensity and stable field distribution even if the main pole 402 and STO 404 are misaligned.

Figure 6C:
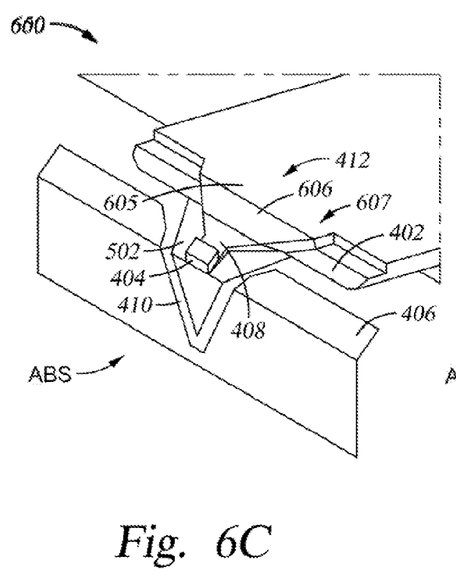
Figure 6D:
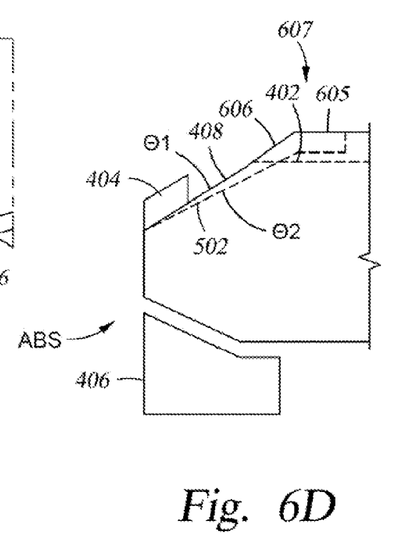

FIG. 6C is a schematic, perspective view of an MAMR head 650 according to certain embodiments. FIG. 6D is a schematic, cross-sectional side view of the MAMR head 650 of FIG. 6C. The MAMR head 650 of FIGS. 6C-6D may be similar to the MAMR head 600 of FIGS. 6A-6B, however a non-magnetic layer 607 is disposed over the main pole 402. The non-magnetic layer 607 may be laminated at the trailing side 412 of the main pole 402 and may comprise materials such as NiCr or $Al_2O_3$. The first inclined surface 408 may extend vertically from the ABS to the main pole 402, the first inclined surface 408 being extended by a sloped surface 606 of the non-magnetic layer 607 to form a planar surface 605. In one example, the main pole 402 exposed adjacent the first inclined surface 408 is reduced by the presence of the sloped surface 606 of the non-magnetic layer 607. The first angle of inclination θ1 defined by the sloped surface 606 may be greater than the second angle of inclination θ2 defined by exposed portions of the main pole 402. Although magnetic flux may be absorbed by the trailing shield 406, it is possible to acquire the same advantages with the non-magnetic layer 607 as the MAMR head 600 of FIGS. 6A-6B.

Figure 7A:
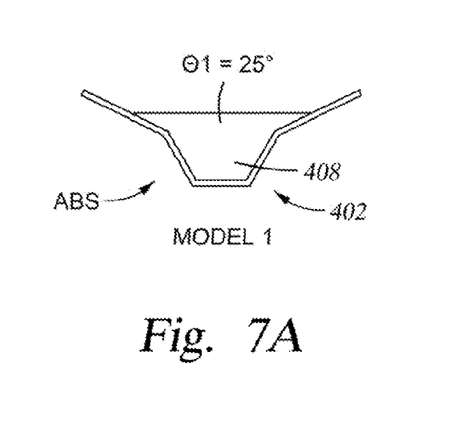
FIGS. 7A-7D are schematic, bottom views of an MAMR head at the ABS according to one embodiment.
Figure 7B:
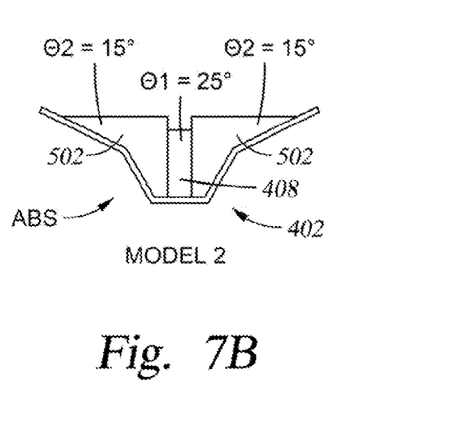

FIGS. 7A-7D are schematic, bottom views of an MAMR head at the ABS. In FIGS. 7A-7D, an STO is not shown for the sake of clarity. FIG. 7A may correlate to the MAMR head 400 of FIGS. 4A-4B. FIG. 7B may correlate to the MAMR head 500 of FIGS. 5A-5B and FIGS. 7C-7D may correlate to the MAMR head 600 of FIGS. 6A-6B. FIG. 7A depicts a portion of the main pole 402 wherein the inclined surface 408 has an angle of inclination θ1=25°. Thus, the inclined surface 408 of the main pole 402 is tapered at an angle of 25° away from the ABS. In this example, the main pole 402 is not etched to lower the element height of the main pole 402.

FIG. 7B depicts a portion of the main pole 402 wherein the inclined surface 408 may taper at an angle of inclination θ1=between about 20° and about 30°, such as about 25° and the exposed surface 502 of the main pole 402 may be removed and taper at an angle of inclination θ2=between about 10° and about 20°, such as about 15°. Thus, the inclined surface 408 and the exposed surface 502 may not occupy a single plane because the angles of inclination are different. A width of the inclined surface 408 may correlate to a width of an STO (not shown) mounted on the main pole 402 at the ABS.

Figure 7C:
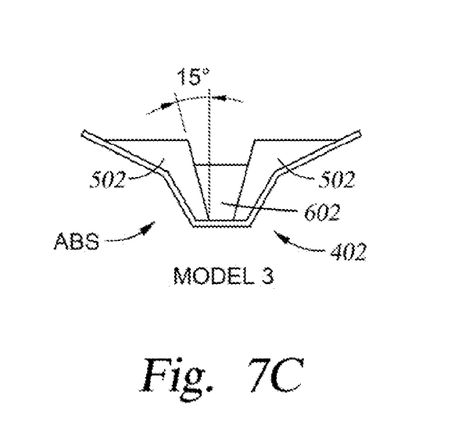

FIG. 7C depicts a portion of the main pole 402 wherein the inclined surface 408 may taper at an angle of inclination θ1=between about 20° and about 30°, such as about 25° and the expanded portion 602 of the main pole 402 may be removed and taper at an angle of inclination θ2=between about 10° and about 20°, such as about 15°. Thus, the inclined surface 408 and the expanded portion 602 may not occupy a single plane because the angles of inclination are different. The first inclined surface 408 may comprise a trapezoidal shape where a width of the STO (not shown) may define a width of the inclined surface 408 at ABS and may expand by an angle of between about 10° and about 20°, such as about 15° away from the ABS.

Figure 7D:
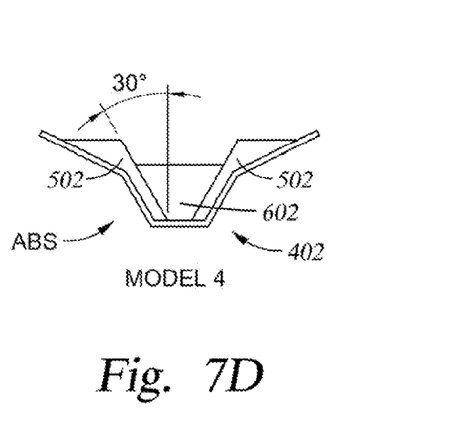

FIG. 7D depicts a portion of the main pole 402 wherein the inclined surface 408 may taper at an angle of inclination θ1=between about 20° and about 30°, such as about 25° and the expanded portion 602 of the main pole 402 may be removed and taper at an angle of inclination θ2=between about 10° and about 20°, such as about 15°. Thus, the inclined surface 408 and the expanded portion 602 may not occupy a single plane because the angles of inclination are different. The first inclined surface 408 may comprise a trapezoidal shape where a width of the STO (not shown) may define a width of the inclined surface 408 at ABS and may expand by an angle of between about 10° and about 20°, such as about 30° away from the ABS.

Figure 8:
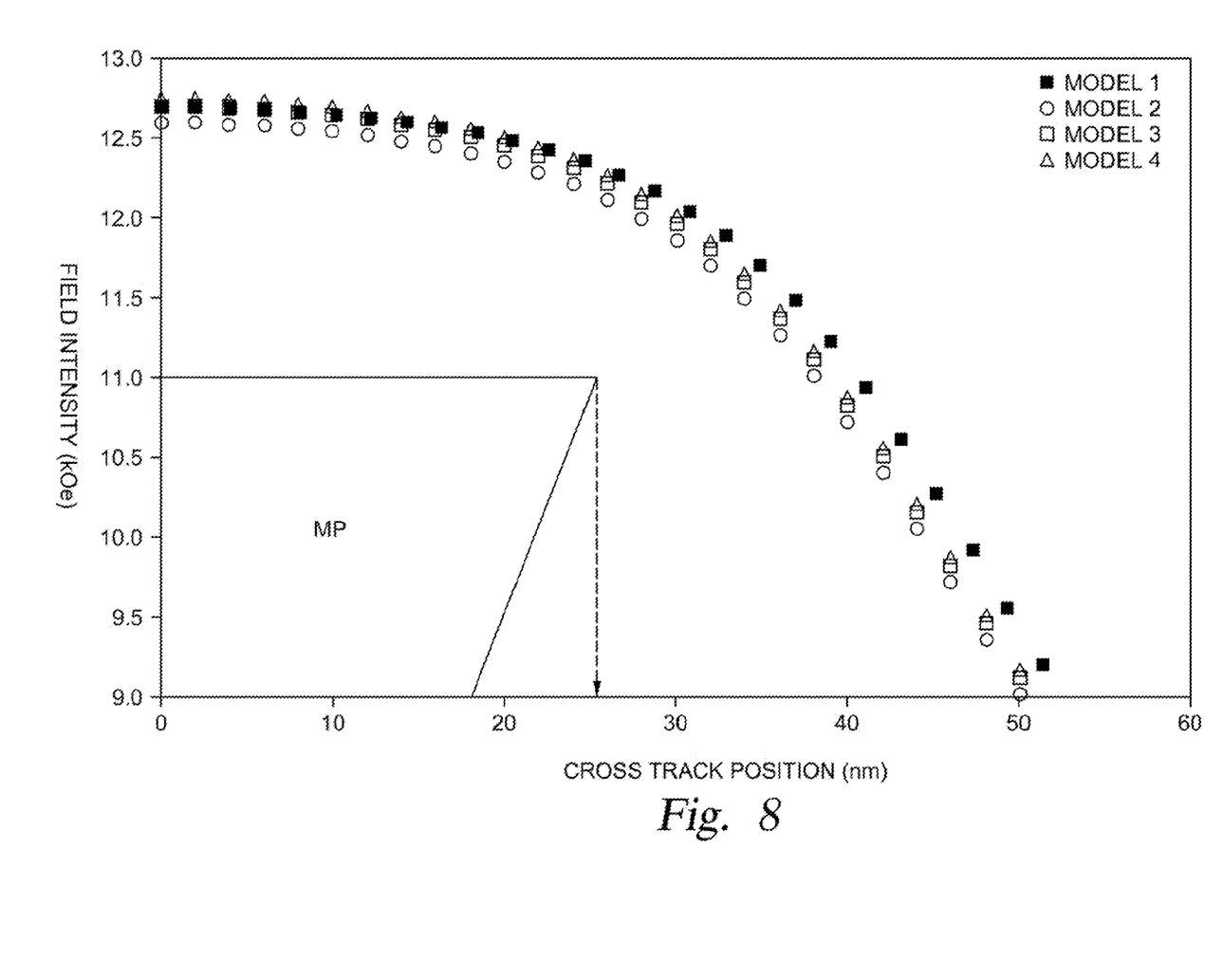
FIG. 8 graphically depicts the results of three dimensional magnetic field calculations of the field intensity distribution in the tack width direction using the examples of FIGS. 7A-7D.

FIG. 8 graphically depicts the results of three dimensional magnetic field calculations of the field intensity distribution in the tack width direction using the examples of FIGS. 7A-7D. Model 1 corresponds to FIG. 7A, model 2 corresponds to FIG. 7B, Model 3 corresponds to FIG. 7C, and model 4 corresponds to FIG. 7D. The calculation conditions are described below. The vertical axis shows the field intensity obtained from the three dimensional magnetic field calculation results while the horizontal axis shows the position in the track width direction on one side from the center of the main pole.

The main pole was covered by a magnetic shield with an interposed nonmagnetic layer. The shield material was assumed to be 80 at % Ni, and 20 at % Fe having a saturation magnetic flux density of 1.0 T. The gap between the main pole and the trailing side shield was 0.020 μm. The gap between the main pole and the width direction shield was 0.080 μm. The gap between the main pole and the leading side shield was 0.120 μm. The main pole had the shape of an inverse trapezium having a trailing side width of 0.050 μm and a bevel angle of 11°. The material was assumed to be CoNiFe with a saturation magnetic flux density of 2.4 T and relative permeability of 500.

For the field intensity measurement, the value at the center position of the recording layer of the magnetic recording medium was calculated. The magnetic recording medium used for the calculations was a material for a soft magnetic backing layer having a saturation magnetic flux density of 1.1 T. The thickness of the magnetic recording layer was assumed to be 0.019 μm and the thickness of the interlayer was assumed to be 0.020 μm. The flying amount of the head slides was taken as 0.011 μm, and the distance of the magnetic recording layer to the measurement position was 0.0205 μm.

In contrast to Model 1 (a conventional example), Models 3 and 4 may have the same field intensity distribution up to the region of 20 nm in the track width direction on one side of the main pole. The field intensity of Models 3 and 4 are lower than in Model 1 due to the effect of restricting the supply of magnetic flux which is a result of reducing the angle of inclination of the inclined surface from 25° to 15° away from the track center. For example, if the field intensity of the main pole which is required to record data to the magnetic recording medium is assumed to be at least 11 kOe, 84 nm track data is written in Model 1 when the position in the track width direction on one side from the center is roughly equal to 42 nm and the write spread is roughly equal to 17 nm with respect to a track width of 25 nm on one side of the main pole. In Models 3 and 4, 76 nm track data is written for a position of roughly 38 nm and the write spread at roughly 8 nm per track is suppresses with respect to Model 1.

In Model 2, the surface of the main pole with an angle of inclination θ2 provides a reduction in the amount of magnetic flux applied and the field intensity drops by about 0.2 kOe with respect to Model 1. If the angle of inclination is set in such a manner that θ1>θ2, write spread in the track width direction may be suppressed in the same way as Models 3 and 4. By forming the main pole such that the angles of the inclined surfaces on the trailing side of the main pole satisfies θ1>θ2, it is possible to shorten the distance between tracks. The assistance effect for locally concentrating the high frequency magnetic field and the main pole magnetic flux may maintain an adequate field intensity even if the STO is misaligned. As a result, a higher recording density may be achieved.

Figure 9:
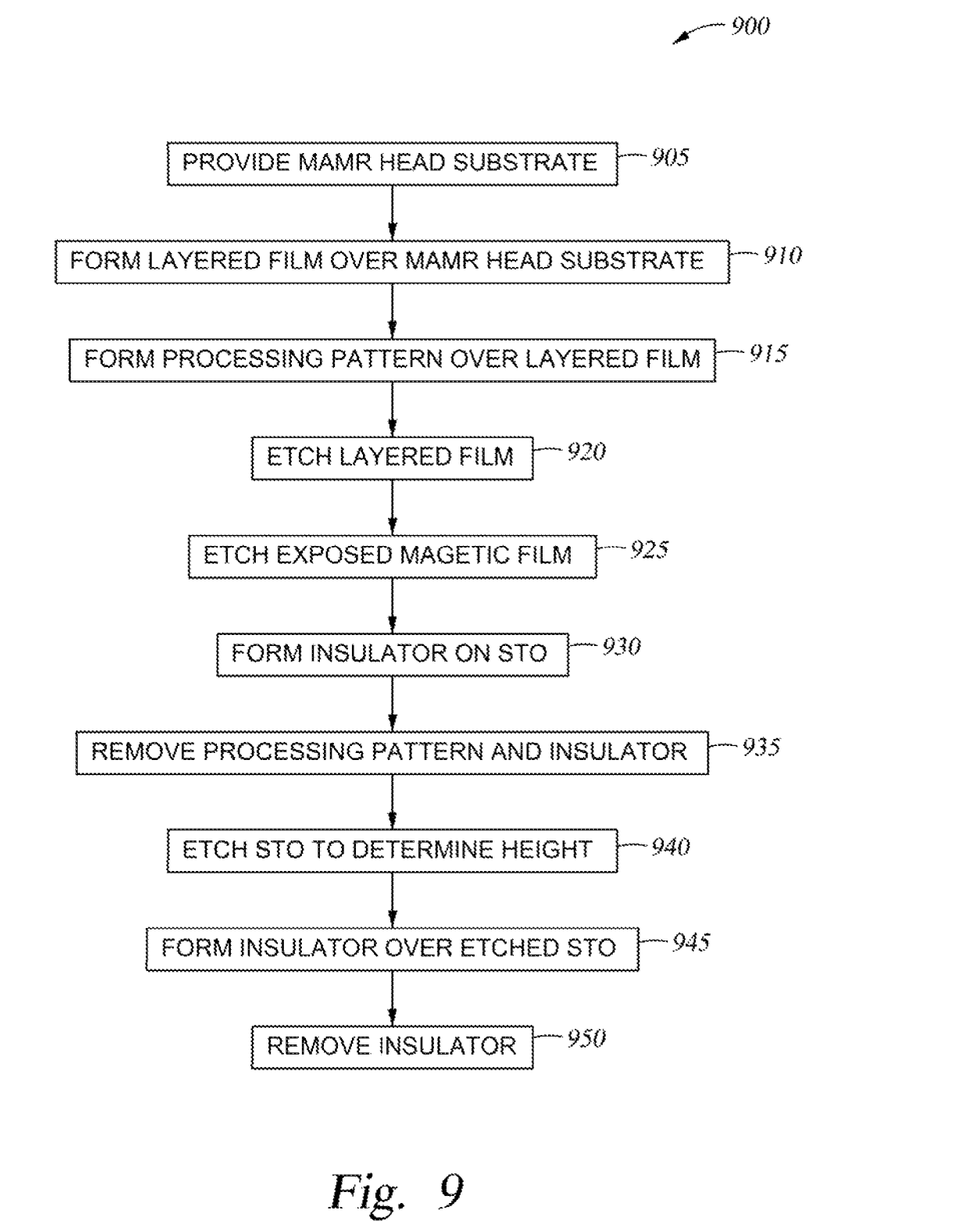
FIG. 9 depicts a flowchart showing a method of forming an MAMR head according to one embodiment.

FIG. 9 depicts a method 900 of forming an MAMR head. In the method 900 described below, the MAMR head, when completely processed, may be substantially similar to the MAMR head 600 of FIGS. 6A-6B. The method 900 may also be utilized to form the MAMR head 500 of FIGS. 5A-5B. The method at operation 905 provides a MAMR head substrate which may comprise the main pole and the trailing shield. The trailing shield may be formed on either side of the main pole. The side gap, which may be a nonmagnetic layer, may be interposed between the main pole and the trailing shield. The main pole may comprise an inverse trapezoidal shape in which the trailing side width may increase and a bevel angle may be provided on the trailing side surface. The trailing side surface may have a flared shape which may expand in the element height direction. The main pole may be formed from a magnetic material, such as CoNiFe, having a saturation magnetic flux density of 2.4 T. The main pole may be formed by a process, such as plating, and then may be planarized by a process such as chemical mechanical polishing (CMP). After planarization, a processing mask, such as a photosensitive resist material, may be provided in the element height direction to form the inclined surface having an angle of inclination θ1 from the ABS. The inclined surface may be formed or etched by an ion milling process or the like and the processing mask may then be removed.

At operation 910, a layered film may be formed over the entire MAMR head substrate. The layered film may comprise a perpendicular magnetic anisotropic body, a magnetization high speed rotating body, a nonmagnetic metal spin conduction layer, and a spin injection layer. The layered film may form the STO upon further processing. The layered film may be deposited by a multiple source sputtering apparatus or the like. At operation 915, a processing pattern may be provided over the layered film. The processing patter may determine the width of the STO and may have a trapezium shape. The processing pattern may be similar to the processing mask described above in operation 905.

At operation 920, the layered film may be etched by an ion milling process of the like in the pattern of the processing pattern. The layered film may be etched to expose a portion of the main pole. The exposed portion of the main pole may be a magnetic film. The amount of etching performed on the layered film may be determined by monitoring the elements in the layered film until a desired end point is reached.

At operation 925, an etching operation may be performed on the exposed magnetic film on the trailing side of the main pole. The etching may be performed using the same processes used to etch the layered film. As such, an ion beam incident angle and incident range may be regulated in order to form the inclined surface angle θ2 on the exposed magnetic film of the main pole. At this point, the layered film has formed the STO and the STO may be electrically insulated to allow for the flow of a bias current which excited a high frequency magnetic field by way of the main pole and the trailing shield. An oxide film, such as aluminum oxide, may be used as the insulating material. At operation 930, the aluminum oxide film may be formed over the entire surface of the MAMR head substrate while the processing mask remains in place. At operation 935, the processing mask may be processed using CMP or the like to expose an upper surface of the processing mask. Further at operation 935, the processing mask and excess aluminum oxide film may be removed using a lift-off process or the like by employing a chemical solution, such as an anisotropic etchant. The resulting STO may be electrically insulated in the width direction.

After operation 935, the trailing side of the main pole on the inclined surface may have an angle of inclination θ1 while the layered film covers a portion of the main pole. The angle of inclination θ2 of the magnetic film of the main pole and the angle of inclination θ1 may satisfy a relationship such that θ1>θ2.

At operation 940, a height of the STO may be determined. The layered film may be etched by ion milling or the like to form a desired STO height. At operation 945, an insulator, such as aluminum oxide or the like, may be formed over the etched layered film (STO) to provide electrical insulation. At operation 950, the insulator may be removed by a lift-off process of the like, to form insulation on the STO in the height direction.

In the resulting MAMR head, the STO for generating a high frequency magnetic field is mounted on the inclined surface of the main pole. The trailing shield may serve as an electrode to enable a flow of bias current to excite a high frequency magnetic field. The inclined surface of the main pole having the angle of inclination θ1 may provide a desirable field intensity and field distribution. A state of magnetic alignment may be achieved such that the high frequency magnetic field generated by the oscillator and the magnetic flux of the main pole are locally concentrated on the magnetic recording medium which is positioned in operation opposite the STO.

It is also contemplated that the embodiments described above may be employed when the ABS of the main pole is recessed. If the ABS is recessed, the same effects may still be achieved provided that the relationship between the angle of inclination θ1 of the inclined surface of the main pole and the exposed magnetic film having an angle of inclination θ2 satisfy the relationship θ1>θ2. In this embodiment, the amount of tapering or recessing of the exposed magnetic film may be reduced to reduce the amount of decrease in material in the ABS surface area.

In sum, the MAMR head structure may provide a magnetic recording device equipped with a high density recording magnetic head. Characteristic variations caused by misalignment of the main pole and the STO may be reduced because the STO is aligned with a position on the main pole where the field intensity is enhanced. The enhanced field intensity may be provided by the angle of inclination $\theta 1$ of the inclined surface on which the STO is formed when compared to the angle of inclination $\theta 2$ around the main pole in the region of the ABS. Data loss via erasure due to the effect of heat fluctuation may be prevented because the high frequency magnetic field of the STO and the magnetic flux of the main pole are concentrated and irradiated onto the magnetic recording medium. Thus, data may be recorded to the magnetic recording medium which has an increased coercive force.

Further, the method for producing the MAMR head makes it possible to produce a MAMR head in which the exposed surface of the main pole has an angle of inclination $\theta 2$ which is less than the angle of inclination $\theta 1$ for the inclined surface of the main pole where the STO is mounted.

While the foregoing is directed to embodiments of the present invention, other and further embodiments of the invention may be devised without departing from the basic scope thereof, and the scope thereof is determined by the claims that follow.

What is claimed is:

1. A MAMR head, comprising:
   a main pole, wherein a first region of the main pole has an angle of inclination $\theta 1$ and a second region of the main pole has an angle of inclination $\theta 2$ which is different from the angle of inclination $\theta 1$;
   a trailing shield formed on a trailing side of the main pole; and
   an STO formed on the main pole adjacent an ABS, wherein the STO is formed on the first region of the main pole, wherein a width of the first region of the main pole adjacent the ABS is substantially identical to a width of the STO, wherein the width of the first region of the main pole remains constant extending away from the ABS, wherein a width of the second region of the main pole expands extending away from the ABS.

2. The MAMR head of claim 1, wherein the angle of inclination $\theta 1$ and the angle of inclination $\theta 2$ satisfy the relationship $\theta 1 > \theta 2$.

3. The MAMR head of claim 2, wherein the angle of inclination $\theta 1$ is between about 20° and about 30°.

4. The MAMR head of claim 3, wherein the angle of inclination $\theta 2$ is between about 10° and about 20°.

5. The MAMR head of claim 1, wherein the trailing shield, the first region of the main pole, and the second region of the main pole comprise a beveled edge.

6. A MAMR head, comprising:
   a main pole, wherein a first region of the main pole has an angle of inclination $\theta 1$ and a second region of the main pole has an angle of inclination $\theta 2$, wherein the angle of inclination $\theta 1$ and the angle of inclination $\theta 2$ satisfy the relationship $\theta 1 > \theta 2$;
   a trailing shield formed on a trailing side of the main pole; and
   an STO formed on the first region of the main pole adjacent an ABS, wherein the STO defines a width of the first region of the main pole at the ABS, wherein the width of the first region of the main pole expands to form a trapezoidal shape extending away from the ABS.

7. The MAMR head of claim 6, wherein the angle of inclination $\theta 1$ is between about 20° and about 30°.

8. The MAMR head of claim 7, wherein the angle of inclination $\theta 2$ is between about 10° and about 20°.

9. The MAMR head of claim 6, wherein a width of the second region of the main pole is reduced extending away from the ABS.

10. The MAMR head of claim 6, wherein the trailing shield, the first region of the main pole, and the second region of the main pole comprise a beveled edge.

* * * * *